United States Patent
Ziv

(10) Patent No.: US 7,213,235 B2
(45) Date of Patent: May 1, 2007

(54) METHOD FOR USING A BUSINESS MODEL USER INTERFACE

(75) Inventor: Tidhar Ziv, Hertzelia (IL)

(73) Assignee: SAP AG, Walldorf (DE)

(*) Notice: Subject to any disclaimer, the term of this patent is extended or adjusted under 35 U.S.C. 154(b) by 613 days.

(21) Appl. No.: 10/630,729

(22) Filed: Jul. 31, 2003

(65) Prior Publication Data
US 2004/0168150 A1    Aug. 26, 2004

Related U.S. Application Data

(60) Provisional application No. 60/448,494, filed on Feb. 21, 2003.

(51) Int. Cl.
*G06F 9/44* (2006.01)
(52) U.S. Cl. ............ 717/135; 717/134; 717/136; 717/137; 717/138
(58) Field of Classification Search ............ 717/2–165; 709/203–318; 345/738
See application file for complete search history.

(56) References Cited

U.S. PATENT DOCUMENTS

| | | |
|---|---|---|
| 5,883,639 A | 3/1999 | Walton et al. |
| 6,141,006 A | 10/2000 | Knowlton et al. |
| 6,377,973 B2 | 4/2002 | Gideon |
| 6,429,882 B1 | 8/2002 | Abdelnur et al. |
| 2001/0037490 A1* | 11/2001 | Chiang ..................... 717/2 |
| 2002/0065950 A1* | 5/2002 | Katz et al. ............... 709/318 |
| 2002/0188674 A1* | 12/2002 | Brown et al. ............. 709/203 |
| 2003/0085918 A1* | 5/2003 | Beaumont et al. ........ 345/738 |
| 2005/0251797 A1* | 11/2005 | Omiya et al. ............. 717/165 |

* cited by examiner

*Primary Examiner*—Meng-Al T. An
*Assistant Examiner*—Mark P. Francis
(74) *Attorney, Agent, or Firm*—Kenyon & Kenyon LLP

(57) ABSTRACT

Method and apparatus for providing a user interface application programming interface (API) for providing extended access to the database by third-party and user software products. In accordance with one embodiment, a method for accessing a business database includes instantiating a company object as an instance of a company class conforming to a component object model standard, setting a server property of the company object to a database server name, setting a company database name property of the company object to the name of a company, setting a user name property of the company object to the name of a user, setting a password property of the company object to a password of the user, setting a language property of the company object to a desired language of the user; and invoking a connect method within the company object, the connect method opening a software connection to a database identified by the company database name property.

20 Claims, 5 Drawing Sheets

METHOD FOR USING A BUSINESS MODEL USER INTERFACE

CROSS REFERENCE TO RELATED APPLICATION

This application claims benefit of priority of U.S. patent application Ser. No. 60/448,494, filed Feb. 21, 2003.

FIELD OF THE INVENTION

The field of the invention relates to user interfaces and, in particular to methods of and user interface application programming interfaces for providing extended user interface access to existing software products.

BACKGROUND

Externally accessing a database through an application developed with a proprietary software product can be a difficult, if not impossible task, especially if no facility has been provided by the developer of the proprietary software product to access the database. This is due to the fact that a user will usually have no insight into the structure of or access mechanism for the database. Therefore, if there is no readily available user interface that the user may use to access the application from a customer program or a third-party add-on program, the user must create his/her own user interface. To create his/her own interface may mean that the user has to "reverse engineer" the application as well as the database structure, file names, etc. to be able to create a program to access the application. Unfortunately, this can lead to numerous problems including crashing the application, corrupting or destroying the data in the database, and obtaining incorrect and/or useless data, to name a few. Accordingly, it would be beneficial to provide a standardized, easy to use user interface that may be used by users of the proprietary software product and third-party developers to access the database.

DETAILED DESCRIPTION

Embodiments of the present invention provide improved methods and application programming interfaces (APIs) for extended user interface access to databases through applications created by proprietary software products in distributed environments. According to an embodiment, the method includes instantiating an applications object to identify all executing applications in a server-based database system, where the applications object may be an instance of an applications class conforming to a component object model standard for interfacing to a business database; and instantiating an application object dynamically from the instantiated applications object to access at least one form and at least one menu in one of the executing applications. The method may also include setting a forms property of the application object to include the at least one form of the executing application; and setting a menus property of the application object to include a menu tree of said executing application, where the menu tree may identify all of the menus in the executing application. The method may further include invoking an item event handler within the application object to catch all of the item events that are non-menu events from the executing application. The method may still further include invoking a menu event handler within the application object to catch all menu events from the executing application.

For example, customer-specific programs, that is, programs developed by customers to interface with the proprietary software, and/or an external third party program may use a standardized user interface API to access the database application that was implemented using the proprietary software product. Specifically, access to the database occurs by using the user API to connect to one or more implemented component object model (COM) objects, which permit access to the application and, ultimately, the database through the application. The connection to the COM objects enables embodiments of the present invention to also provide access to forms, controls with the forms and menus within the database. Therefore, embodiments of the present invention may provide a standard easy to implement and use user interface to access data stored in a database(s) by using an application created using a proprietary software product to manage the database.

Figure 1:
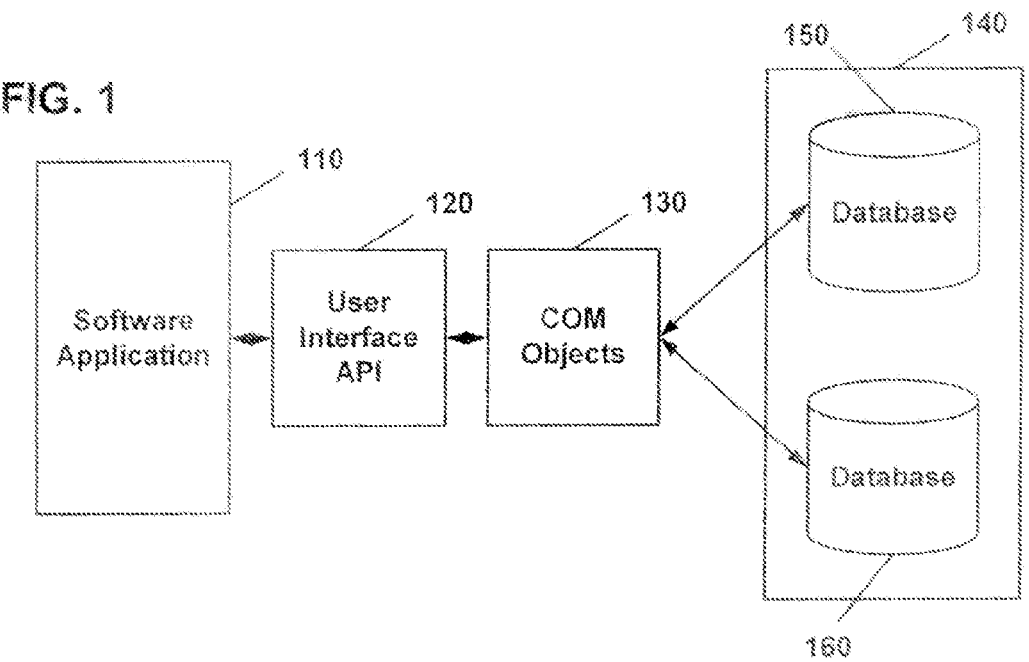
FIG. 1 is a high-level block diagram of a computer system incorporating a user interface application programming interface (API) that communicates with component object model (COM) objects to interface to a host business database, in accordance with an embodiment of the present invention.

FIG. 1 is a high-level block diagram of a computer system incorporating a user interface application programming interface (API) that communicates with component object model (COM) objects to interface to a host business database in accordance with an embodiment of the present invention. COM is a standard interface for communication of objects in distributed applications. In FIG. 1, a software application 110, for example, an add-on software application, may be connected to a user interface API 120, which may be connected to a COM objects 130. COM objects 130 may be connected to a host computing system 140, for example, a database management system such as a Business One database system from SAP AG of Waldorf, Germany. Specifically, COM objects 130 may be used to access information in one or more business databases 150, 160 through active forms and menus in host computing system 140.

In accordance with an embodiment of the present invention, in FIG. 1, user interface API 120 may make additional functionality available to a user of, for example, software application 110 to manipulate the data in business databases 150, 160. User interface API 120 may be implemented as a collection of COM objects including distributed COM (DCOM) objects, which may provide access to existing forms, controls within the forms and menus to access data in one or both of business databases 150, 160. Specifically, user interface API 120 may be used to integrate customer-specific programs as well as third party products into host computing system 140. For example, this integration may include the addition of buttons to a user interface of host computing system 140 to enable software application 110 to access business databases 150, 160.

Figure 2:
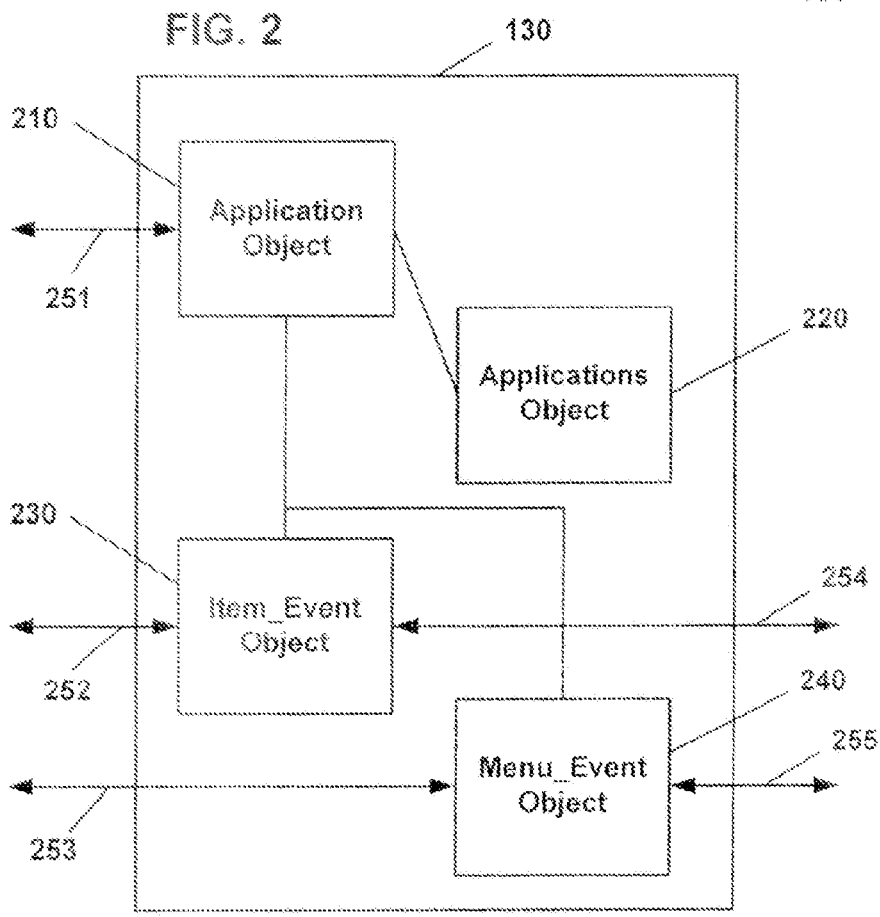
FIG. 2 is a block diagram of COM objects that together provide an integrated user interface to a host business database, in accordance with an embodiment of the present invention.

FIG. 2 is a block diagram of COM objects 130 that may provide an integrated user interface to a host business database according to an embodiment of the present invention. For example, in FIG. 2, COM objects 130 may include an application object 210, an applications object 220, an item_event object 230 and a menu_event object 240. Each of these objects may be used to enable communication between software application 110 and business databases 150, 160 in FIG. 1.

In FIG. 2, in accordance with an embodiment of the present invention, application object 210 may represent a connection to a currently working database application, for example, the application that is currently accessing one of business databases 150, 160, in FIG. 1. Returning to FIG. 2, application object 210 may be used to connect to the menus and/or forms of the currently running database application to manipulate the data therein. Applications object 220 may act as the root object to hold an identification for each of the database applications that are currently running on host computing system 140 in FIG. 1.

In accordance with an embodiment of the present invention, in FIG. 2, item_event object 230 may catch all non-menu events, that is, all events that are not menu events in the running application and permit software application 110 to manipulate the data in at least one of business databases 150, 160 in FIG. 1. Similarly, returning to FIG. 2, menu_event object 240 may catch all menu events in the running application and also permit software application 110 to manipulate the data in business databases 150, 160 in FIG. 1. For example, in FIG. 2, a request 251 from software application 110 using user interface API 120 to connect to database 150 may be received by application object 210. Although the embodiment in FIG. 2 only shows application object 210 receiving request 251 directly from software application 110, in other embodiments it may also receive request 251 via applications object 220. In response to request 251 application object 210 may connect to item_event object 230 and menu_event object 240 and invoke item event and menu event handlers to deal with subsequent user inputs. Specifically, item_event object 230 may catch all of the events 252 (that is, user inputs) that are not menu events (for example, on form, form Item, etc.) made in the application by the user. In response to each item event 252, item_event object 230 may request 254 item data from database 150. Similarly, menu event object 240 may catch menu events 253 (that is, user menu selections, for example, click on a leaf menu item only) made in the application by the user. In response to each menu event 253, menu_event object 240 may request 255 menu data from database 150.

Figure 3:
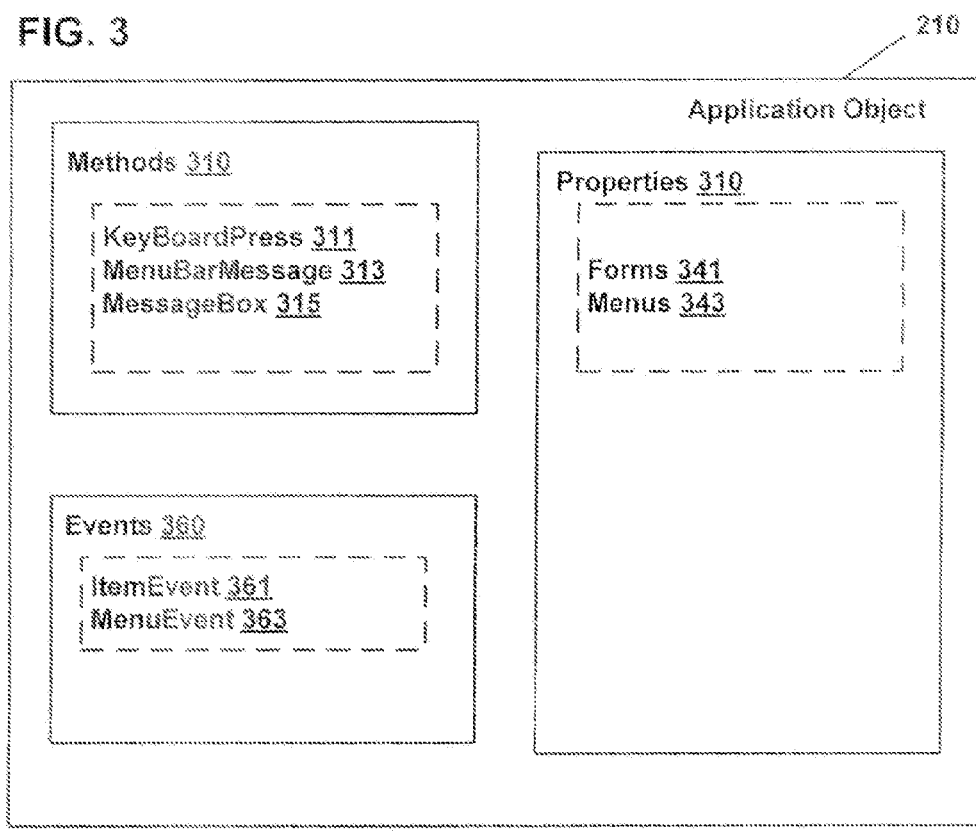
FIG. 3 is a detailed diagram of the elements of the application object, in accordance with an embodiment of the present invention.

FIG. 3 is a detailed diagram of the elements of application object 210, in accordance with an embodiment of the present invention. Specifically, in accordance with the embodiment in FIG. 3, application object 210 may include a variety of methods 310, which may include a KeyboardPress method 311, a MenuBarMessage method 313, and a MessageBox method 315. Application object 210 may also include a variety of properties 340, which may include a Forms property 341 and a Menus property 343. Lastly, application object 210 may include a variety of events 360, which may include an ItemEvent event 361 and a MenuEvent event 363. The embodiment in FIG. 3 is merely illustrative of one of the many possible embodiments of the present invention, and in no way limits the scope of the present invention to this embodiment alone.

In accordance with an embodiment of the present invention, a more comprehensive, but not exclusive, list of methods that may be associated with application object 210 may include those listed and described in Table 1.

TABLE 1

| Methods | Description |
| --- | --- |
| Activate | Activates the menu item (the same as activating it from the menu bar manually). |
| Add | Adds new objects to the collection. The new objects may include: variables, valid values, columns, conditions, datasources, forms, items, groupeditems and groupeditems. |
| KeyboardPresss | Simulates a key press event on the application. |
| MenuBarMessage | Sends a new active Business object. |
| MenuExist | Checks if a menu exists. |
| MessageBox | Sends a modal message box to the application and receives a returned button index. |
| Remove | Removes a menu item. |
| Select | Selects a new valid value from the collection. |
| SetGroup | Gathers items into form group (radio buttons & tabs only). |

For example, in accordance with an embodiment of the present invention, a more comprehensive, but not exclusive, list of the properties that may be associated with application object 210 may include those listed and described in Table 2.

TABLE 2

| Properties | Description |
| --- | --- |
| Activation Success | When Before_Action is False, gives the status on which event was handled by the application. |
| AppId | MenuEvent: Identify the application on which this event took place. Currently working only with one running application. ItemEvent: Uniquely identify the application. Is not used when working with only one working application. |
| BckRGBColor | Sets the background color for Item, Column, Column Title and Cell. |
| Before Action | Specifies whether the event sent before the application handled the event or before. |
| BeforeAction | Indicates whether the event handled is before the application processes the event or after. |
| BracketCloseNum | Number of closing brackets for the condition. |

TABLE 2-continued

| Properties | Description |
|---|---|
| BracketOpenNum | Number of opening brackets for the condition. |
| Cells | Cells collection, one per matrix row. |
| CharVal | A long value. |
| Checked | CheckBox: Holds the current boolean status of the check box. Setting this property causes the check box to be checked/unchecked.<br>MenuItem: Gets/Sets menu item check mark value. |
| . |  |
| . |  |
| . |  |
| Forms | Holds the forms alive in the application in current time. Use to access the Form object by its ID (Instance ID field); its Type & Instance Count (Form Type & Type Counter fields); and its index (0 based), in the forms collection. |
| . |  |
| . |  |
| . |  |
| Menus | Holds the menu items in a hierarchical structure, which reflect the application menu tree in current time. Use to access the MenuItem object by its ID (recursive/flat search), or index (0 based). |
| . |  |
| . |  |
| . |  |
| Userproperties | Holds user defined variables. |
| . |  |
| . |  |
| . |  |

For example, in accordance with an embodiment of the present invention, a partial list of the events that may be associated with application object 210 may include those listed and described in Table 3.

TABLE 3

| Events | Description |
|---|---|
| ItemEvent | Catches all the events that are not menu events (on form, form Item, etc.) made in the application. |
| MenuEvent | Catches menu events (click on leaf menu item only) made in the application. |

Figure 4:
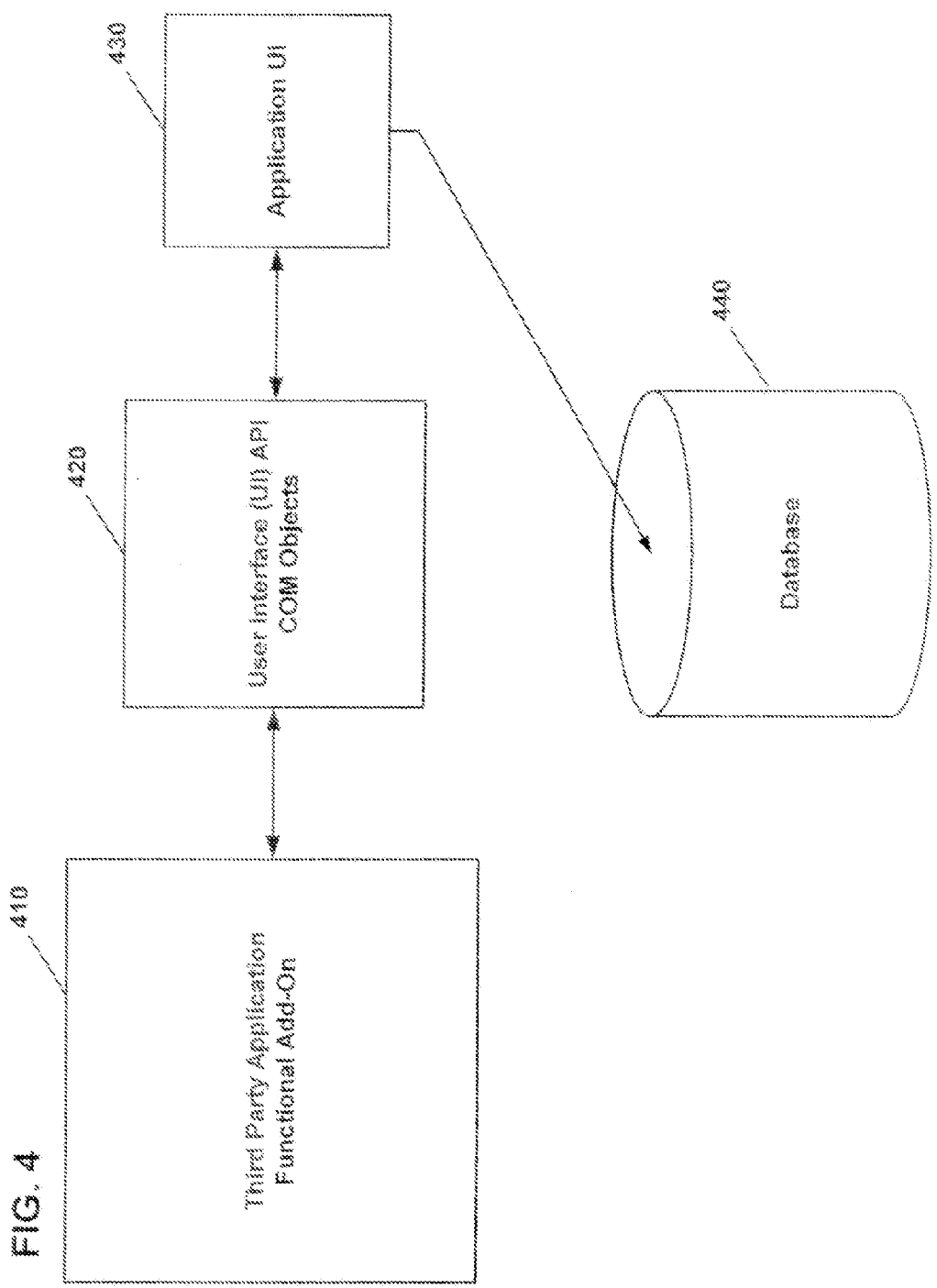
FIG. 4 is a diagram of a user interface API for providing extended functionality to an existing database system, in accordance with an embodiment of the present invention.

FIG. 4 is a diagram of a user interface API for providing extended functionality to an existing database system, in accordance with an embodiment of the present invention. In FIG. 4, a third party application functional add-on 410 may connect to a user interface API COM objects 420, which may be connected to a standard user interface 430 for a database 440.

In FIG. 4, user interface API 420 may contain a variety of COM objects. The COM objects may be referred to as business objects and the business objects may have associated with them various methods for updating, retrieving and manipulating data in database 450. Examples of some, but not necessarily all, of the classes of business objects and a description of each object that may be included are listed and described in Table 4.

TABLE 4

| Objects | Description |
|---|---|
| Application | The application object reflects the currently working application. The application instance is used to connect to its containers (e.g., menus or forms), for event manipulation and for property settings. |
| Applications | The applications object reflects all currently running |

TABLE 4-continued

| Objects | Description |
|---|---|
|  | applications. There is only one instance of the applications object, which is used as root by all COM-clients. |
| Cell | Reflects a matrix cell identified by row/column. |
| CheckBox | Allows the user to check/uncheck a checkbox. |
| Column | Identifies a matrix column. |
| ColumnTitle | Settings for column title (background color, font etc.). |
| Condition | SQL condition for SELECT-query. |
| DataSource | Represents one data source object (e.g. table). |
| EditText | Holds specific properties for editing of text. |
| Folder | Represents the Tab-item. |
| Form | This object holds all data of the referenced form that is open for manipulation by the UI-API. |
| GroupedItems | Used to gather items (Radio Buttons, Tabs) into a group. |
| Item | The Item object is uniquely identified by its item number in a form and holds all data of the referenced item in the application, that is open for manipulation by the UI-API. |
| Items | This object holds all information of all items of a form (buttons, edit text items etc.); the Item object can be accessed by its ID (long integer) or index (short integer). |
| ItemEvent | Catches all events except menu events (on forms, form items) made in the application. |
| LinkedButton | Specific for linked item type. |
| Matrix | For item type it_TABLE this object holds a reference to the matrix object. With this object column, rows and properties of the matrix can be accessed. |
| MenuEvent | Catches all menu events made in the application. |
| MenuItem | This object is used to activate the specified menu item in the application. |
| OptionBtn | Used to select a radio button (cannot un-select). |
| Popup | Popup a combo box. |
| ValidValue | This object is referenced by the combo box object. |
| Var | Holds a user-defined variable; can be attached to the UserProperties-property of the Form object. |

Figure 5:
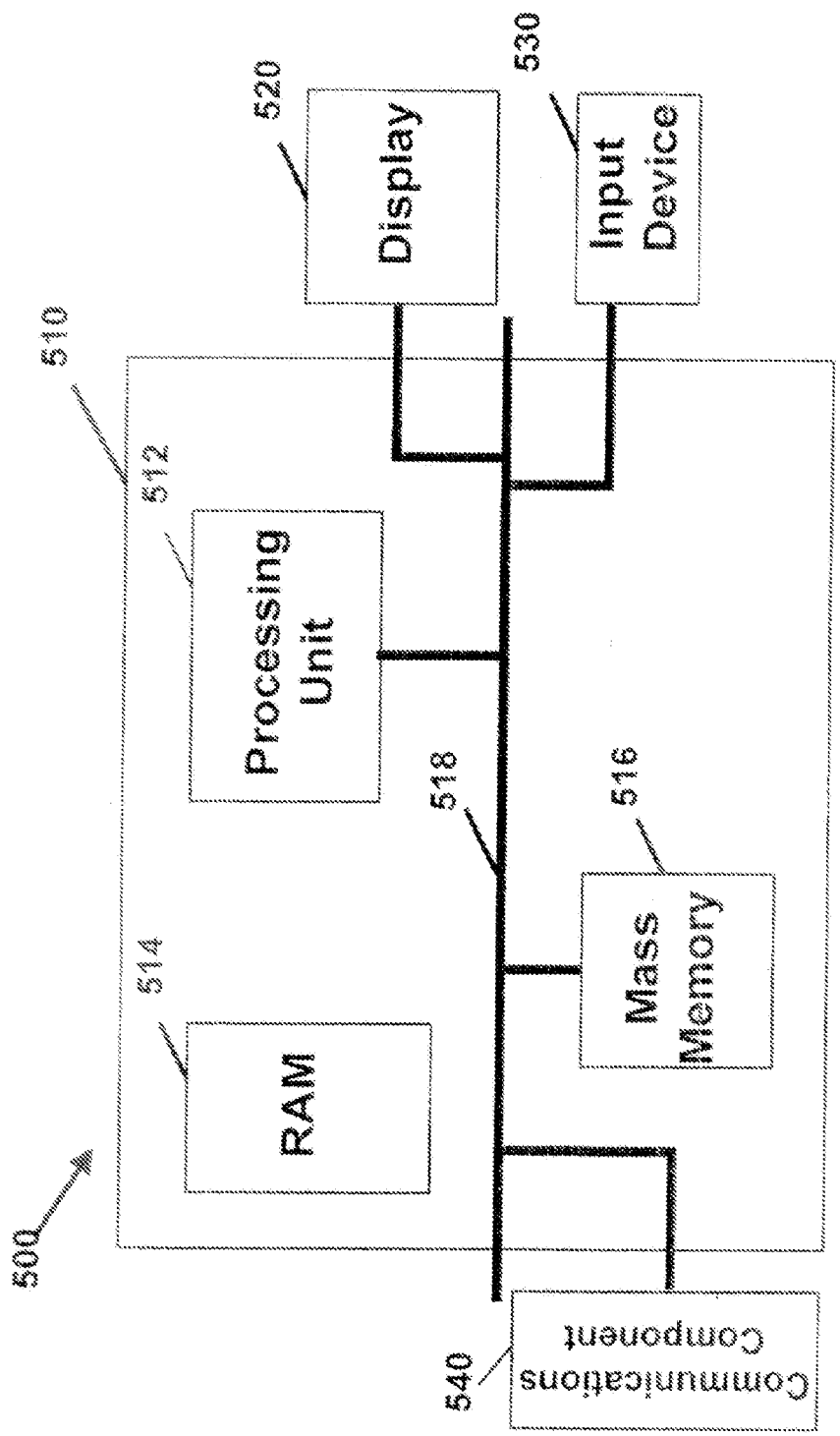
FIG. 5 is a block diagram of a client computer system for providing extended functionality to an existing database system through the user interface API, in accordance with an embodiment of the present invention.

FIG. 5 is a block diagram of a client computer system for implementing the user interface, in accordance with an embodiment of the present invention. In FIG. 5, a client computer system 500 includes a processing component 510 coupled to a display component 520, an input component 530 and a communication component 540. Processing component 510 may include a central processing unit 512, a random access memory (RAM) 514 and a mass memory system 516 coupled together via a main system bus 518. Mass memory system 518 may include an operating system, a browser program, a database data access component and an application for accessing an incompatible database. In fact, in embodiments of the present invention, the operating system may include Microsoft® Windows®98 second edition, Windows® 2000 sp1 or higher, Windows® XP® or Windows®) NT® with sp5 or higher. The browser program may, for example, include Microsoft® Internet Explorer 5.5 or higher. The database data access component may, for example, include Microsoft® data access component v2.5 (mdac_typ.exe). The application accessing the incompatible database may include, for example, a software development kit such as, for example, SAPBobsCom.dll from SAP.

In FIG. 5, in accordance With an embodiment of the present invention, display component 520 may include, for example, a standard CRT, a liquid crystal display, a flat panel display. Input component 530 may include, for example, a keyboard, a writing tablet, and a voice-to-text subsystem. Communication component 540 may include, for example, a dial-up modem, a digital cable modem, a direct network connection, and a wireless modem.

Figure 6:
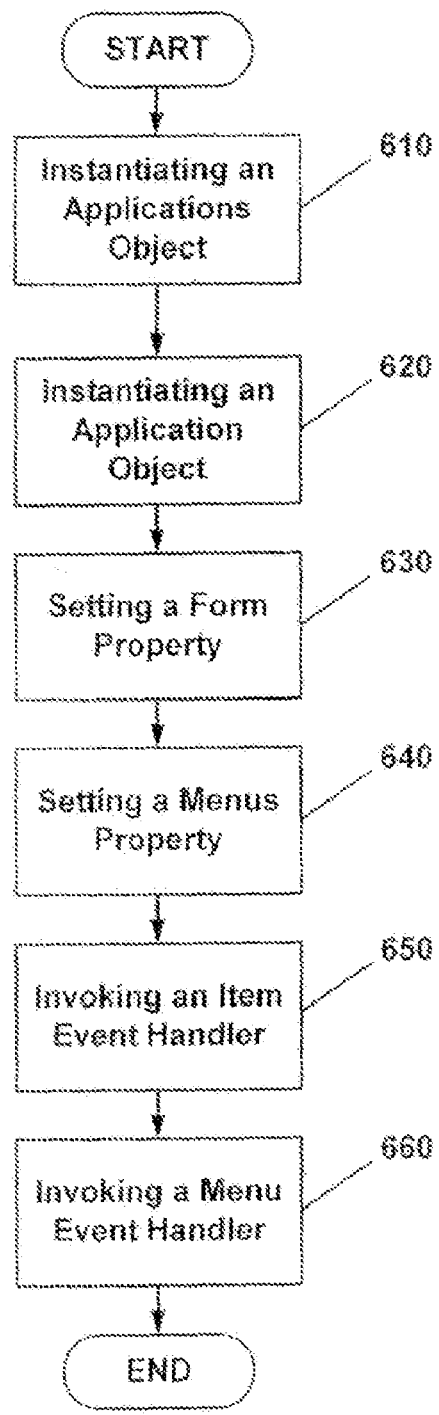
FIG. 6 is a flow diagram of a method for interfacing an external program with a database system to manipulate existing user interface objects, in accordance with an embodiment of the present invention.

FIG. 6 is a flow diagram of a method for interfacing to a business database, in accordance with an embodiment of the present invention. In FIG. 6, the method may include software application 110 instantiating (610) applications object 220 and instantiating (620) application object 210 as an instance of applications object 220 conforming to the COM standard in, for example, business database 150. The method also may include software application 110 setting (630) a form property of application object 210 to the forms currently alive in the application, and setting (640) a menus property of application object 210 to reflect the current application menu tree. The method also may include software application 110 invoking (650) an item event handler within application object 210 and invoking (660) a menu event handler within application object 210.

Several embodiments of the present invention are specifically illustrated and described herein. However, it will be appreciated that modifications and variations of the present invention are covered by the above teachings and come within the purview of the appended claims without departing from the spirit and intended scope of the invention.

What is claimed is:

1. A method of connecting an external program to a server-based database system comprising:
   instantiating an applications object to identify all executing applications in said server-based database system, said applications object being an instance of an applications class conforming to a component object model standard for interfacing to a business database;
   instantiating an application object dynamically from said instantiated applications object to access at least one form and at least one menu in one of said executing applications;
   setting a forms property of said application object to include said at least one form of said executing application;
   setting a menus property of said application object to include a menu tree of said executing application, said menu tree identifying all menus in said executing application;
   invoking an item event handler within said application object to catch all item events that are non-menu events from said executing application; and
   invoking a menu event handler within said application object to catch all menu events from said executing application,
   wherein said instantiating an application object comprises instantiating a plurality of methods in said application object including:
      a key board press method to simulate a key press event in the application;
      a menu bar message method to send a new active business object; and
      a message box to send a modal message box to the application and receive a returned button index.

2. The method of claim 1 wherein said instantiating an application object comprises:
   instantiating a plurality of properties in said application object including:
      said forms property; and
      said menus property.

3. The method of claim 2 wherein said instantiating an application object comprises:
   instantiating a plurality of events in said application object including:
      an item event; and
      a menu event.

4. The method of claim 1 further comprising:
   responding to an item event, said item event is generated by said instantiated application object.

5. The method of claim 4 wherein said responding to said item event comprises:
   retrieving a form object dynamically from said instantiated application object based on information obtained from said item event.

6. The method of claim 1 further comprises:
   responding to a menu event, said menu event being generated by said instantiated application object.

7. The method of claim 6 wherein said responding to said menu event comprises:
   retrieving a form object dynamically from said instantiated application object based on information obtained from said menu event.

8. A machine-readable medium having stored thereon a plurality of executable instructions for performing a method comprising:
   instantiating an applications object to identify all executing applications in said server-based database system, said applications object being an instance of an applications class conforming to a component object model standard for interfacing to a business database;
   instantiating an application object dynamically from said instantiated applications object to access at least one form and at least one menu in one of said executing applications;
   setting a forms property of said application object to include said at least one form of said executing application;
   setting a menus property of said application object to include a menu tree of said executing application, said menu tree identifying all menus in said executing application;
   invoking an item event handler within said application object to catch all item events that are non-menu events from said executing application: and invoking a menu event handler within said application object to catch all menu events from said executing application, wherein said instantiating an application object comprises instantiating a plurality of methods in said application object including:

a key board press method to simulate a key press event in the application;

a menu bar message method to send a new active business object; and a message box to send a modal message box to the application and receive a returned button index.

9. The machine-readable medium of claim 8 wherein said instantiating an application object comprises:

instantiating a plurality of properties in said application object including:

said forms property; and said menus property.

10. The machine-readable medium of claim 9 wherein said instantiating an application object comprises:

instantiating a plurality of events in said application object including:

an item event; and a menu event.

11. The machine-readable medium of claim 10 wherein said method further comprises:

responding to an item event, said item event being generated by said instantiated application object.

12. The machine-readable medium of claim 11 wherein the responding to said item event comprises:

retrieving a form object dynamically from said instantiated application object based on information obtained from said item event.

13. The machine-readable medium of claim 10 wherein said method further comprises:

responding to a menu event, said menu event being generated by said instantiated application object.

14. The machine-readable medium of claim 13 wherein said responding to said menu event comprises:

retrieving a form object dynamically from said instantiated application object based on information obtained from said menu event.

15. A data processing system having one or more processors comprising:

means for instantiating an applications object to identify all executing applications in said server-based database system, said applications object being an instance of an applications class conforming to a component object model standard for interfacing to a business database;

means for instantiating an application object dynamically from said instantiated applications object to access at least one form and at least one menu in one of said executing applications;

means for setting a forms property of said application object to include said at least one form of said executing application;

means for setting a menus property of said application object to include a menu tree of said executing application, said menu tree identifying all menus in said executing application;

means for invoking an item event handler within said application object to catch all item events that are non-menu events from said executing application; and means for invoking a menu event handler within said application object to catch all menu events from said executing application, wherein said means for instantiating an application object comprises means for instantiating a plurality of methods in said application object including:

a key board press method to simulate a key press event in the application;

a menu bar message method to send a new active business object; and a message box to send a modal message box to the application and receive a returned button index.

16. The data processing system of claim 15 wherein said means for instantiating an application object comprises:

means for instantiating a plurality of properties in said application object including:

said forms property; and said menus property.

17. The data processing system of claim 16 wherein said means for instantiating an application object comprises:

means for instantiating a plurality of events in said application object including:

an item event; and a menu event.

18. The data processing system of claim 15 further comprising:

means for responding to an item event, said item event being generated by said instantiated application object.

19. The data processing system of claim 18 wherein said means for responding to an item event comprises:

means for retrieving a form object dynamically from said instantiated application object based on information obtained from said item event.

20. The data processing system object of claim 15 further comprising:

means for responding to a menu event, said menu event being generated by said instantiated application object.

* * * * *